(12) United States Patent
Burke et al.

(10) Patent No.: US 9,367,379 B1
(45) Date of Patent: Jun. 14, 2016

(54) AUTOMATED SELF-HEALING COMPUTER SYSTEM

(71) Applicant: Sprint Communications Company L.P., Overland Park, KS (US)

(72) Inventors: Terrance Gordon Burke, Overland Park, KS (US); Sreedhar Reddy Busanelli, Overland Park, KS (US); Kenneth D. Glenn, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 136 days.

(21) Appl. No.: 14/254,889

(22) Filed: Apr. 16, 2014

(51) Int. Cl.
*G06F 11/07* (2006.01)

(52) U.S. Cl.
CPC .................... *G06F 11/076* (2013.01)

(58) Field of Classification Search
CPC ............ G06F 11/3409; G06F 11/008; G06F 11/0748; G06F 11/3447
See application file for complete search history.

(56) References Cited

U.S. PATENT DOCUMENTS

| 7,181,651 | B2* | 2/2007 | Gross | G06F 11/0751 714/37 |
| 7,185,071 | B2* | 2/2007 | Berg | G06F 8/61 709/220 |
| 8,533,337 | B2* | 9/2013 | Maldaner | H04L 41/00 709/203 |
| 8,667,096 | B2* | 3/2014 | Dehaan | H04L 41/0806 709/203 |
| 8,832,256 | B2* | 9/2014 | Dehaan | G06F 15/177 709/220 |
| 9,141,803 | B2* | 9/2015 | Klyuchevskyy | G06F 21/572 |
| 2015/0138945 | A1* | 5/2015 | Carrillo | H04L 41/0654 370/216 |

* cited by examiner

*Primary Examiner* — Amine Riad

(57) ABSTRACT

A server. The server comprises a processor, a memory, and an application that receives an alert message corresponding to an error and a performance metric value in a messaging server, wherein the messaging server is one of a plurality of servers in a rotation that supports a front-end application in a system, identifies a course of action for repair, determines that the number of active servers in the rotation is above a predefined threshold number of active servers, removes the messaging server from the rotation, notifies a system administrator of the removal, the identified error, and the performance metric value, repairs the messaging server by implementing the identified course of action, validates the messaging server by running application programming interface (API) calls, places the repaired messaging server in the rotation, and notifies the system administrator of repair details and API call results.

19 Claims, 6 Drawing Sheets

AUTOMATED SELF-HEALING COMPUTER SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a large-scale computing system, there may be hundreds of servers that perform ongoing business operations in an enterprise. These servers may receive requests from front-end applications, send transaction requests to back-end servers, or vice versa for processing by other servers and/or computers. Transactions may be independent processing tasks, assignments, or functions.

In some circumstances, these servers may undergo a variety of problems, such as power outages, memory leaks, software crashes, and other issues due to changes in load, stress, or failure. These problems may affect services provided at front-end applications and may ultimately disrupt operations in the enterprise.

SUMMARY

In an embodiment, a server for an automated self-healing computer system is disclosed. The system comprises a processor, a memory, and a self-healing application stored in the memory that, when executed by the processor, is configured to receive an alert message corresponding to an at-risk messaging server in a system, wherein the at-risk messaging server is one of a plurality of messaging servers in a server rotation that supports a front-end application, and wherein the alert message identifies an error and a corresponding performance metric value that meets or exceeds a predefined value for operation in the messaging server, identify a course of action for repairing the messaging server based on the error and performance metric value, determine if the number of active messaging servers in the server rotation is above a predefined threshold number, wherein the predefined threshold number represents a minimum number of active messaging servers needed to support the one or more front-end applications, upon determining that the number of active messaging servers in the server rotation is above the predefined threshold number, remove the messaging server from the server rotation, send a notification message to a system administrator, wherein the notification message reports the removal of the messaging server and identifies the error and the performance metric value, repair the messaging server by implementing the identified course of action, validate the repaired messaging server by running application programming interface (API) calls, wherein the results from the API calls are obtained, upon completion of validation, place the repaired messaging server in the server rotation, and send a second notification message to the system administrator, wherein the second notification further comprises details of the repair and results from the API calls.

In an embodiment, a method performed by a computer system for automated self-healing is disclosed. The method comprises receiving, at an application, an alert message corresponding to an at-risk messaging server in a computer system, wherein the at-risk messaging server is one of a plurality of messaging servers in a server rotation that supports a front-end application in the system, and wherein the alert message identifies an error and a corresponding performance metric value that meets or exceeds a predefined value for operation in the messaging server, identifying a course of action for repairing the messaging server based on the error and performance metric value, determining by the application if the number of active messaging servers in the server rotation is above a predefined threshold, wherein the predefined threshold represents a minimum number of active messaging servers to support the one or more front-end applications, upon determining that the number of active messaging servers in the server rotation is above the predefined threshold, removing the messaging server from the server rotation in the system, repairing the messaging server by implementing the identified course of action, validating the repaired messaging server by running application programming interface (API) calls at the one or more front-end applications, wherein the results from the API calls are obtained, upon completion of validation, placing the repaired messaging server in the server rotation in the system, and sending a notification message to the system administrator, wherein the notification further comprises details of the repair and results from the API calls.

In an embodiment, a method of monitoring and implementing self-healing in a system is disclosed. The method comprises monitoring transactions and performance metrics by an application for each of a plurality of messaging servers in a server rotation, wherein the plurality of messaging servers are coupled to a front-end application in a computer system, determining if a value of any of the performance metrics for each messaging server meets or exceeds a predefined value, wherein the predefined value indicates a value for messaging server operation, upon determining that the value in a performance metric meets or exceeds the predefined value, generating at the application an alert message associated with a messaging server that is at-risk of failure in the system, wherein the alert message identifies the performance metric value and an error in the at-risk messaging server, identifying a course of action for repairing the messaging server based on the performance metric value and the error, determining if the number of active messaging servers in the server rotation is above a predefined threshold, wherein the predefined threshold represents a minimum number of active messaging servers needed to support the one or more front-end applications, upon determining that the number of active messaging servers in the server rotation is above the predefined threshold, removing the messaging server from the server rotation in the system, notifying a system administrator of the removal of the messaging server, wherein the notification comprises the performance metric value and error responsible for the removal, repairing the messaging server by implementing the identified course of action, validating the repaired messaging server by running application programming interface (API) calls at the one or more front-end applications, wherein the results from the API calls are obtained, upon completion of validation, and placing the repaired messaging server in the server rotation in the system.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description.

DETAILED DESCRIPTION

Figure 1:
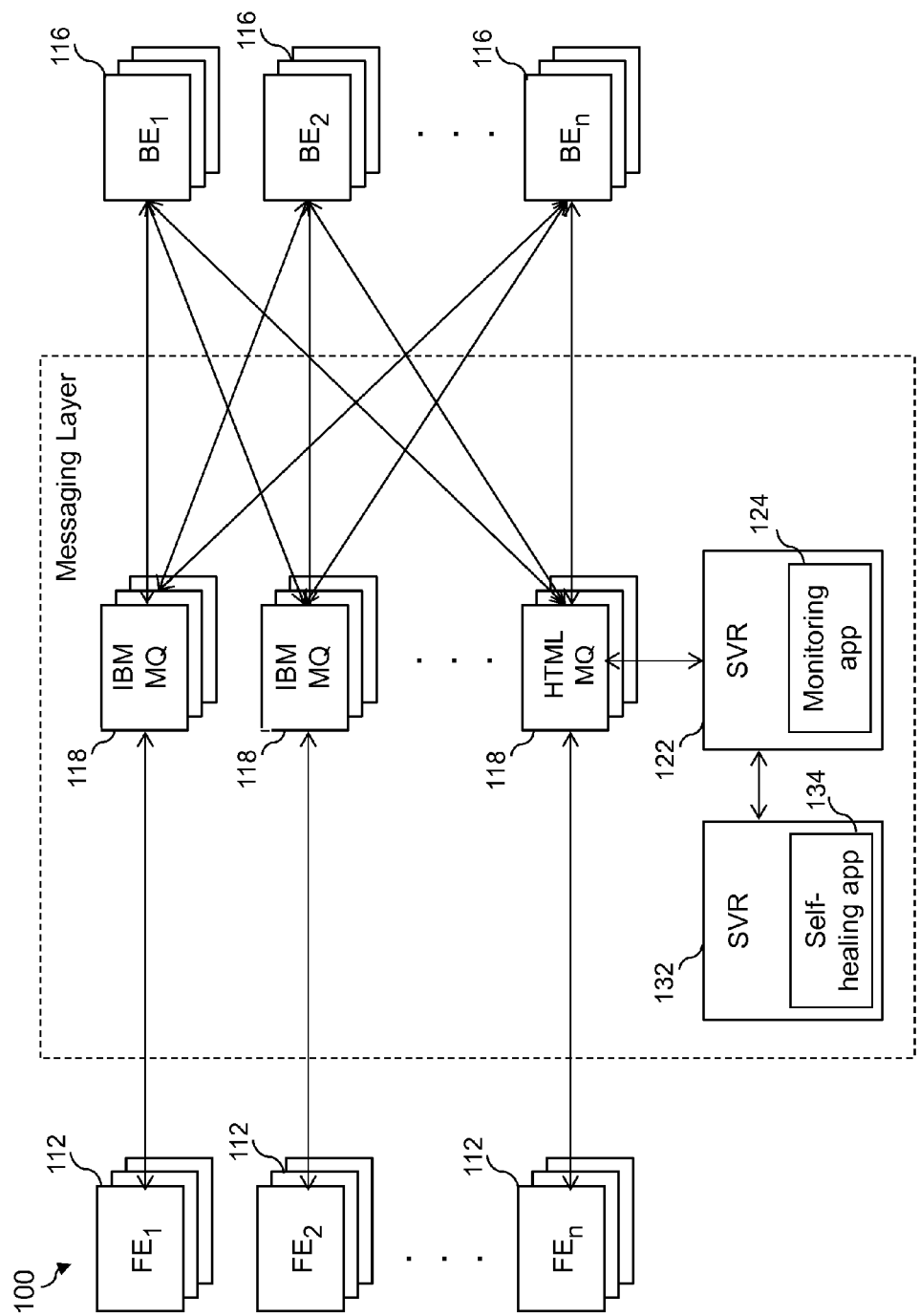
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

It may be difficult for technicians to manage performance and to conduct maintenance in a large-scale computer system and/or information technology system, for example a system that may comprise hundreds of servers. Servers that experience problems may be maintained and restored to proper operation service technicians or information technology (IT) staff members who identify problems and come up with adequate solutions to return machines to proper operation. Service technicians or IT staff members may perform administrative tasks and run utilities to diagnose a problem or an issue experienced by a server. However, due to the size of the system, maintaining and managing performance for hundreds of servers without degradation of service to end users may be challenging. Therefore, it may be beneficial for an enterprise to use a system to monitor and remedy issues in different applications or servers involved in the large-scale system. Disclosed herein are systems, apparatuses, and methods for implementing an automated self-healing computer system.

The present disclosure teaches a self-healing application for resolving issues and problems experienced by messaging servers in a computer system. The computer system may comprise a plurality of messaging servers in a messaging layer that allows communication between a plurality of front-end application servers and a plurality of back-end application servers. The plurality of messaging servers may employ message queues to receive and deliver messages to intended recipients within the computer system.

There may be a server rotation of the plurality of messaging servers in the system, wherein the messaging servers in a rotation may support one front-end application in the computer system. Each front-end application may be associated with a different rotation of messaging servers and/or a different set of messaging servers. It is understood that a single front-end application may execute on a plurality of front-end application servers, for example when the processing load for a front-end application is heavy and better supported by executing on two or more front-end application servers. The server rotation may be beneficial for load balancing in order to handle the load of messages received from and sent to various components in the computer system. The server rotation may be useful in isolating message handling for one front-end application from message handling for a different front-end application, such that if the message handling for one front-end application is experiencing a problem, the message handling for the other front-end applications may be performed normally. A server rotation may comprise two servers, five servers, ten servers, or some other number of servers.

In an embodiment, a messaging server in the system may fail due to changes in load, stress, failure, or other issues. These causes may correspond to errors in the messaging server, wherein specific errors may be identified by monitoring transactions and performance metric values within the plurality of messaging servers. Examples of errors that may occur in the messaging servers may be power outages, memory leaks, failed file validations, and other issues. In an embodiment, a memory leak may not be directly observed or monitored but instead may be inferred from progressively reducing spare memory capacity or progressively reducing spare heap memory capacity. Transactions may refer to independent processing tasks, assignments, or functions, whereas performance metrics may comprise standards of measurement for operation in the messaging servers. Some examples of performance metrics may be response times, memory capacity, or throughput.

According to the disclosure, automated self-healing may be implemented by executing the self-healing application, wherein the self-healing application may initially receive an alert message associated with an error in an at-risk messaging server. The term "at-risk" as used herein may refer to any messaging server with a corresponding performance metric value that has met or exceeded a predefined value for operation in the messaging server. There may be a plurality of performance metrics comprising criteria for server operation within the messaging servers, wherein predefined values for the performance metrics and corresponding alerts may be set by a system administrator. In an embodiment, performance metrics may comprise response times, memory utilization, CPU utilization, number of network connections, number of active threads, and other performance metrics associated with server operation. The performance metric values may be tracked by a monitoring application in the computer system. The monitoring application and the self-healing application may both be abstracted as executing within the messaging layer of the system, wherein both of these applications may be employed to monitor and remedy issues, respectively, within the plurality of messaging servers.

The monitoring application may track performance metrics in the plurality of messaging servers and send one or more alert messages to the self-healing application upon detecting an error in an at-risk messaging server. As used herein, the term 'error' may be used to refer to a failure of processing or a failure to meet a promised level of message handling performance. Additionally, the term 'error' may be used to refer to a condition of a performance metric exceeding a predefined threshold value (e.g., CPU utilization exceeding a predefined threshold value or used memory exceeding a predefined threshold value) or a condition of a performance metric falling below a predefined threshold value (e.g., CPU idle time falling below a predefined threshold value or remaining memory capacity falling below a predefined threshold value). It is understood that such an error condition can exist—for example CPU utilization above 80%—even when the subject messaging server is performing proper messaging handling.

After receiving an alert message regarding the at-risk messaging server, the self-healing application may identify a course of action for repairing the messaging server based on the identified error and performance metric value. The course of action may refer to an action or a set of actions for repair that may have been predefined in the self-healing application code or configured by the system administrator. Each error may be associated with a specific course of action, whereas the course of action may be the same for multiple errors in the messaging server. In an embodiment, if the identified error is a memory leak, then the course of action may comprise rebooting the messaging server and/or restarting a particular service on the messaging server in order to free up memory resources.

After the course of action has been identified, the self-healing application may determine if the number of active messaging servers in the server rotation is above a predefined threshold. As used herein, "active" messaging servers may refer to messaging servers that are currently in-service or being used in the server rotation. The number of active messaging servers in the server rotation may comprise the at-risk messaging server. The predefined threshold may comprise a minimum number of active messaging servers needed to support a front-end application. The minimum number of active messaging servers may represent the number of messaging servers needed to handle the load of messages received and sent to support the subject front-end application.

If the number of active messaging servers in the server rotation is determined to be equal to or below the predefined threshold, then removing the at-risk messaging server from service may degrade performance in the system, particularly at the front-end. That is, there may not be enough active messaging servers in the server rotation to handle the messaging load without degraded service to the front-end application if the at-risk messaging server is removed. Thus, the self-healing application may keep the at-risk messaging server in the server rotation and send a message to the system administrator to report the identified error and performance metric value. The message may also notify the system administrator that the at-risk messaging server is still in the server rotation since the number of active messaging servers in the server rotation is equal to or below the predefined threshold. However, at a later time, the system administrator or self-healing application may determine that there are enough active messaging servers in the server rotation to allow for the removal and subsequent repair of the at-risk messaging server. Alternatively, if the number of active messaging servers in the server rotation is determined to be above the predefined threshold, then the self-healing application may remove the messaging server from the server rotation in the system. The self-healing application may notify the system administrator of the identified error, performance metric value, and the subsequent removal of the messaging server.

In an embodiment, when a messaging server is determined to be at-risk but not qualified for removing from its server rotation, due to a low number of active servers in the same server rotation, the self-healing application may begin polling the other servers in the same server rotation to determine as soon as possible when another server comes into service. When the self-healing application determines that another server has rejoined the server rotation, it may then take the at-risk server out of the rotation to take corrective action. In an embodiment, the self-healing application may query the monitoring application for updated performance metrics on the at-risk messaging server or may command the monitoring application to redetermine the performance metrics of the at-risk messaging server before taking the server out of the rotation. If the performance metrics of the messaging server that had previously been determined to be at-risk are improved sufficiently, the self-healing application may forgo the process of taking that messaging server out of the rotation. In an embodiment, the self-healing application may wait a predetermined time after the additional server comes into service before taking the at-risk server out of the rotation, for example to allow enough time for the monitoring application to collect one or more cycles of performance metrics from the additional server to confirm that it is likely to stay up and not flag under the increased load if the at-risk server goes off line. In this situation, the evaluation of the additional server, the messaging server that had been out of the rotation for a repair and returned to the rotation recently, may be based on a second predefined threshold that is more aggressive than normal, based on the assumption that taking the at-risk messaging server out of rotation would cause the recently recovered messaging server to decrease in performance.

Next, the self-healing application may initiate repair of the messaging server by implementing the identified course of action. In an embodiment, the repair may comprise a reboot or a restart of the messaging server. Once the repair is complete, the repaired messaging server may be validated by running application programming interface (API) calls. In an embodiment, API calls may represent specific operations that front-end applications may invoke to perform certain tasks, such as querying data, obtaining metadata, or running utilities to perform administration tasks. The API calls may be executed at the one or more front-end applications that are supported by the repaired messaging server. The results from the API calls may then be received by the self-healing application at the messaging layer. After validation is complete, the self-healing application may place the repaired messaging server back in the server rotation in the messaging system and notify the system administrator. The notification may comprise details of the repair, such as the course of action that was implemented, as well as the results from the API calls.

The disclosed automated self-healing system may be advantageous in that the system may accelerate repairs in messaging servers and mitigate risks to front-end applications or systems. By automating self-healing, the disclosed system may allow at-risk messaging servers to be taken out of server rotation and repaired after checking the number of active messaging servers in the rotation. It may be beneficial to check the number of active messaging servers in the rotation prior to removing at-risk messaging servers from service in order to prevent performance degradation at the front-end. After completing repair, the resulting repaired messaging servers may then be validated by running front-end API call, wherein the repaired servers may be placed back in the server rotation in a timely manner. Conventional methods for repairing servers may entail a lag time which depends on how long it takes for a service technician to get to the repair. The service technician may be responsible for hundreds of servers in the system; thus, this manual method may take a longer period of time (e.g., hours or days) than the time needed to implement a repair with the self-healing application. In an embodiment, a failed or at-risk messaging server may be taken out of the server rotation and repaired by the disclosed system in a time that is on the order of seconds or a few minutes (e.g., 30 seconds, 45 seconds, 1 minute, etc.). For perspective, in some cases manual maintenance of the same issue may consume about 26 minutes.

Additionally, the disclosed system may minimize risks at front-end applications that may be affected by one or more failed messaging servers. There may be a plurality of end users that interact directly with the front-end applications and request services. These requests may be forwarded to the plurality of back-end servers by the plurality of messaging servers, wherein the plurality of messaging servers deliver and receive messages to and from the front-end applications and back-end servers. If one or more messaging servers fail, then the corresponding front-end applications may also be impacted, wherein services at the front-end may not be available for the associated end users. Therefore, by monitoring performance metric values, checking server rotations, and initiating and validating repairs in at-risk messaging servers, the present disclosure may provide a system that may be able to manage server performance and availability in the messaging layer. It is contemplated that the disclosed self-healing computer system may in many cases detect, correct, verify or validate the correction, and return to service a messaging server before any problem is observed by users of the front-end applications.

FIG. 1 is a block diagram of a system 100 according to an embodiment of the disclosure. The system 100 comprises a plurality of front-end application servers 112, a plurality of back-end servers 116, a plurality of messaging servers 118, a server 122, and a server 132. It is understood that system 100 may comprise any number of front-end application servers 112, back-end servers 116, and messaging servers 118. It is understood that a plurality of different front-end applications may execute on a single front-end application server 112 or a single front-end application may execute on a plurality of front-end application servers 112. The servers 112, 116, 118, 122, and 132 may be implemented as computer systems. Computer systems are described further hereinafter. In the system 100, the components 112, 116, 118, 122, and 132 may be interconnected by a network. As a person of ordinary skill in the art will readily recognize, the network may comprise one or more communication networks and may be any combination thereof of private or public communication networks.

The plurality of front-end application servers 112 and/or front-end applications may comprise software applications that receive user input, process requests, and provide services to a plurality of end users. The plurality of end users may comprise customers associated with an enterprise, wherein the end users may interact directly with the plurality of front-end application servers 112 and/or with the front-end applications. The end users may also be employees or an enterprise, such as customer care representatives or clerks at a retail store associated with a mobile communication service provider. In an embodiment, the plurality of front-end application servers 112 and/or front-end applications may be accessed through a graphical user interface or a web browser. The plurality of end users may request services by using the front-end application servers 112 and/or front-end applications, wherein the requests may be forwarded to the plurality of back-end servers 116. Examples of requested services may be related to support services, billing services, or other customer care related services.

For example, a customer care representative may input a query to a front-end server 112 about a payment history of a subscriber of a mobile communication service provider. The front-end server 112 may generate an account query transaction and send the transaction as a message to the messaging server 118. The messaging server 118 may place the transaction message on a message queue associated with the back-end server 116. The back-end server 116 may retrieve the transaction message from the message queue, process the transaction by retrieving the requested information about the subscriber account from a back-end account history data store, and return a reply message to the messaging server 118. The messaging server 118 may place the reply message on a message queue associated with the front-end server 112. The front-end server 112 may retrieve the reply message from the message queue and present information about the subscriber account in a user interface of the customer care representative.

The plurality of back-end servers 116 may comprise computer systems that are coupled to one or more front-end application servers 112, wherein each back-end server 116 supports services for the one or more front-end application servers 112. In an embodiment, the back-end servers 116 may reside in remote locations and may receive service requests initiated by end users at the front-end application servers 112, wherein the service requests may be forwarded by the plurality of messaging servers 118. Alternatively, the back-end application servers 116 may not be at remote locations but may be located in a corporate headquarters or other corporate office of an enterprise or business.

The plurality of messaging servers 118 may be intermediate servers that mediate communication and interactions between the plurality of front-end application servers 112 and the plurality of back-end servers 116, promoting message flow (e.g., transaction requests or query requests) from the front-end application servers 112 to the back-end servers 116 and message flow (e.g., replies to requests) from the back-end application servers 116 to the front-end application servers 112. A system administrator may configure message queuing software, such as a queue manager, in the plurality of messaging servers 118. The plurality of messaging servers 118 may utilize any network protocol or format to implement a message queue system to deliver and receive alert messages and notifications to and from different components in the system 100 (e.g., front-end application servers 112, back-end servers 116, server 122, and server 132). For example, messages may be placed in a queue and stored until the recipient retrieves them. The messaging servers 118 may queue received messages and deliver them when the addressed front-end application 112 or back-end server 116 is ready to receive the subject message.

In an embodiment, the plurality of messaging servers 118 may be referred to as middleware, messaging layer servers, and/or middle servers. The messaging servers 118 and any other servers and/or hosts that promote message flow between the front-end application servers 112 and the back-end servers 116 may be referred to as a messaging layer 117. The plurality of messaging servers 118 may comprise message queue manager servers or other messaging platforms. In some contexts, the messaging platforms may be said to provide the messaging layer 117 or a message transport layer. In some contexts, the messaging platforms may be referred to as messaging middleware.

In an embodiment, a messaging server 118 may be an IBM Message Queue (MQ) server or a HyperText Transfer Protocol (HTTP) server. The plurality of messaging servers 118 may queue messages and also transform messages to varying network protocols or formats corresponding to different components in the system 100. In an embodiment, one or more message brokers may be implemented using the plurality of messaging servers 118 to transform messages from one format to another and route messages between components. In another embodiment, there may also be a web services device employed in the messaging layer of the system 100. The web services device may run web services in connection with the plurality of messaging servers 118 and the plurality of front-end application servers 112.

In the system 100, an end user may make a data request by using one of the plurality of front-end application servers 112, wherein the data request may be for retrieving specific account information from the back-end servers 116. This request and other messages from the front-end application server 112 may be transported by a rotation of messaging servers 118, wherein there may be a predefined number of messaging servers 118 supporting each front-end application.

For example, there may 3 messaging servers 118 supporting a first front-end application, there may be 5 messaging servers 118 supporting a second front-end application, or there may be another predefined number of messaging servers 118 supporting front-end applications. The predefined number of messaging servers 118 supporting each front-end application may be selected by the system administrator, for example based on the message flow rate associated with each front-end application.

A server rotation may be useful for load balancing among the plurality of messaging servers 118. For example, there may be increases in the load of messages received and sent in the system 100 over periods of time. If a certain messaging server 118 is unable to deliver a data request or message, there may be a number of messaging servers 118 remaining in the rotation of messaging servers 118 that support the front-end application 112. Thus, another messaging server 118 may be selected to send the data request or message to a back-end server 116, wherein the back-end server 116 may fulfill the request and use the selected messaging server 118 to relay the obtained data back to the front-end application 112. Therefore, peak messaging loads may be handled by multiple messaging servers 118 in the rotation in order to reduce the time delay of sending messages to and receiving responses at components in the system 100. The server rotation of the plurality of messaging servers 118 may help provide services to front-end application servers 112 even in the event of server failure.

Although the server rotation may be beneficial in maintaining the availability of messaging servers 118 for the front-end application servers 112, recurring issues or problems with the plurality of messaging servers 118 may continue to occur. In an embodiment, the plurality of messaging servers 118 may experience a variety of issues or errors over periods of time. These issues may range from power supply failures to memory leaks and may entail multiple repairs by the system administrator or service technicians. Over time, these repairs may be challenging to keep up with, especially in a large scale system with hundreds of messaging servers 118. Additionally, degraded service may be experienced by front-end applications and/or front-end application servers 112 before a problem is identified, diagnosed, and manual repairs completed. Therefore, it may be advantageous to monitor transactions and performance metrics of the messaging servers 118 in order to identify errors, conduct repairs, and prevent a disruption of services for the end users.

To meet these needs, the server 122 and the server 132 may further comprise a monitoring application 124 and a self-healing application 134, respectively. Alternatively, in an embodiment, the monitoring application 124 and the self-healing application 134 may be executed on a single server and/or computer system. The monitoring application 124 may be employed to monitor the health and performance of the messaging servers 118 for the support of front-end application servers 112. The monitoring application 124 may track performance metrics, detect problems, and report findings to the self-healing application 134, wherein the self-healing application 134 may take action based on the reported findings. In an embodiment, the monitoring application 124 may be referred to as a monitoring tool or an application performance management tool.

The monitoring application 124 may track performance metrics and analyze the metrics to detect and/or infer problems in messaging servers 118 in order to prevent deterioration of performance at the front-end application servers 112. This proactive monitoring may allow the enterprise to detect issues beforehand and improve the experiences of end users who may be utilizing the front-end application servers 112. The system administrator may monitor transactions and set specific alerts and predefined values for performance metrics in the plurality of messaging servers 118. In an embodiment, a transaction may refer to any operation or computing that is performed within the plurality of messaging servers 118, such as independent processing tasks, assignments, or functions. In an embodiment, performance metrics may be related to power management, capacity, reliability, availability, scalability, and other criteria for server operation. Performance metrics may comprise counts, durations, rates, percentages, and other values associated with specific transactions that may be monitored.

The monitoring application 124 may track the amount of physical memory employed in each messaging server 118, such as the total memory, cached memory, and available memory in each messaging server 118. The monitoring application 124 may track an amount or percentage of utilized memory. In an embodiment, memory may be measured in a unit of bytes, kilobytes (KB), megabytes (MB), or another similar unit. Additionally, the monitoring application 124 may measure a response time or duration for each transaction within the messaging server 118, as well as a corresponding status of each process or transaction. The response time may refer to the time it takes for the messaging server 118 to respond to a data request from the front-end application server 112, for example the time taken by the messaging server 118 to enqueue the data request on a message queue. Alternatively, the response time may refer to the time it takes for the messaging server 118 to enqueue a response received from a back-end server 116 onto a message queue. In an embodiment, the monitoring application 124 may measure the number of transactions per second or another rate to determine throughput. In another embodiment, throughput may be measured in a unit of kilobytes per second (kbps), megabytes per second (mbps), or another unit. By tracking performance metrics, the monitoring application 124 may be used to determine whether or not the messaging servers 118 meet performance criteria for safe and successful server operation.

From this tracking, specific alerts may be triggered based on predefined values set by the system administrator for monitoring transactions and performance metrics in the plurality of messaging servers 118. In an embodiment, an alert may be triggered due to a specific performance metric value that meets or exceeds a predefined value or that falls below a predefined value, as the case may be (e.g., some thresholds are defined and monitored as 'not to exceed' values while other thresholds are defined and monitored as 'not to fall below' values). There may be one or more predefined values for various performance metrics that may trigger specific alert messages in the system 100. The predefined values may indicate levels or values for operation in the messaging servers 118.

In an embodiment, there may be multiple predefined values that correspond to percentages of memory usage in the messaging servers 118. For example, a first predefined value may be set to 80% to indicate that memory usage is high in a particular messaging server 118. Although this predefined value is high, the messaging server 118 may not be considered to be at a critical level since there is still 20% of memory capacity remaining. A second predefined value may be set to 95% in order to indicate that memory usage is at a critical level, wherein the messaging server 118 is at a higher risk for failure than the risk indicated by an 80% memory usage level.

It is understood that other predefined values and other predefined thresholds are contemplated by the present disclosure.

Additionally, specific alert messages may be triggered depending on which predefined values are met or exceeded for different performance metrics. For example, if the memory usage in a particular messaging server 118 is at 85%, then a subsequent alert message may be generated indicating high memory usage since the usage in the messaging server 118 has exceeded the first predefined value of 80%. Furthermore, if the memory usage is at 95%, then another alert message may be generated indicating critical memory usage since the usage in the messaging server 118 meets the second predefined value of 95%. Therefore, one or more alert messages may be triggered by different performance metric values meeting or exceeding the predefined values, wherein each alert message indicates a specific error in the messaging server 118. In an embodiment, an alert message may indicate that an error in a messaging server 118 has occurred or that the error in the messaging server 118 is about to occur.

There may be a variety of errors that may occur in the plurality of messaging servers 118. For example, there may be multiple errors associated with the unavailability of Java service on the messaging servers 118. In an embodiment, the messaging servers 118 may employ different versions of Java. Errors may be detected in the messaging servers 118 by monitoring performance metric values corresponding to running Java, wherein specific alert messages may be sent from the monitoring application 124 to the self-healing application 134 upon detection of each error. Some examples of specific Java errors may comprise errors related to Java instances, out of memory errors, unavailable threads, framework, or unavailable resources.

In another embodiment, errors in the messaging server 118 may be associated with a web services device that may be employed in the messaging layer of the system 100. For example, a web services device may be an IBM DataPower device that runs web services in connection with the plurality of messaging servers 118 and the plurality of front-end application servers 112. The web services device may employ web service definition language (WSDL) documents which may comprise information regarding specific services requested from the front-end application servers 112. A WSDL document may be involved in configuration and validation of a service request at the web service device associated with the messaging server 118 in the messaging layer.

In an example, the messaging server 118 may experience a failed file validation error corresponding to an invalid or corrupt WSDL document. Without a valid WSDL document, the web services devices may not be able to compile the WSDL document and load it into memory if the document is invalid or corrupt. Therefore, an alert message may be triggered to notify the self-healing application 134 of this error. Another similar error may comprise a secure socket layer (SSL) proxy profile error, wherein this error may be associated with a file or certificate issue which may prevent validation at the web services device.

Other errors that may occur in association with the web services device may comprise errors related to power supply failure, exhaustion of execution resources, running out of encrypted space or temporary space, or running out of memory for a web service. Encrypted space may refer to internal, persistent storage on the web services device, whereas temporary space may refer to non-persistent storage in which files will be lost upon rebooting or powering down the device. These errors related to running out of encrypted space, temporary space, or memory for a web service may result in an alert message which may inform the self-healing application 134 to free up storage in the web service device by rebooting the device.

In another embodiment, errors in the messaging server 118 may be associated with a message broker, wherein the message broker may be employed to transform messages from one format to another and route messages between components in the system 100. Upon receiving an input message, the message broker may run a message flow comprising a sequence of processing steps. Execution groups comprising specific groupings of message flows may be assigned to the message broker. Errors associated with the message broker may be related to a non-working queue manager, message broker statuses, message flow statuses, and execution group statuses.

The variety of the aforementioned errors and other issues in the messaging servers 118 may be detected by monitoring performance metric values in each messaging server 118. Upon detection, corresponding alert messages may be triggered to notify the self-healing application 134 of an at-risk messaging server 118 in need of repair. Alert messages may also be triggered due to particular behaviors or events that may be detected by tracking performance metric values and transactions through the monitoring application 124. In an embodiment, an alert message may be sent from the monitoring application 124 to the self-healing application 134 in server 132. Upon receiving the alert message regarding an at-risk messaging server 118, the self-healing application 134 may be employed to perform a repair in the at-risk messaging server 118.

First, the self-healing application 134 may identify a course of action for repairing the at-risk messaging server 118 based on the specific error and performance metric value indicated in the alert message. The course of action may refer to an action or a set of actions for repair that may have previously been identified and/or configured by the system administrator. For each error that may occur, there may be a corresponding course of action for repairing the error in the messaging server 118. In an embodiment, the course of action may be the same for multiple errors in the messaging server 118. For a variety of different errors, the course of action may be to reboot the messaging server 118 or restart a particular service on the messaging server 118. For example, if the error is related to running Java, then the course of action identified by the self-healing application 134 may be to restart the Java virtual machine on the messaging server 118. If the error is related to the message broker associated with the messaging server 118, then the course of action may be to restart the corresponding service on the messaging server 118. If the error is associated with running out of memory or a memory leak, then the course of action may be to reboot the device in order to free up memory resources In some instances, the error in the messaging server 118 may not be associated with a course of action for repair that may be implemented by the self-healing application 134. In these instances, the self-healing application 134 may determine that the error in the messaging server 118 may be best addressed by a manual repair and may notify the system administrator accordingly. For example, if there is a web services device error associated with the messaging server 118 (e.g., failed file validation error), then the system administrator may be notified to in order to request manual repair of the messaging server 118 by a service technician or IT member. In an embodiment, the messaging server 118 that is identified for manual repair may be removed from the server rotation automatically.

After receiving the alert message regarding an at-risk messaging server 118 and identifying the course of action for repair, the self-healing application 134 may check the number of active messaging servers 118 in the server rotation, wherein "active" messaging servers may refer to messaging servers 118 that are currently in-service or being used in the server rotation, for example a rotation associated with a front-end application. The number of active messaging servers 118 in the subject server rotation may comprise the at-risk messaging server 118. The self-healing application 134 may determine if the number of active messaging servers 118 in the server rotation is above a predefined threshold. The predefined threshold may represent a minimum number of active messaging servers 118 needed to handle the load of messages received from and sent to the front-end application 112. In an embodiment, this predefined threshold may be less than the predefined number of messaging servers 118 that are in the server rotation of messaging servers 118 that support each front-end application 112, wherein the predefined number of messaging servers may be set by the system administrator.

For example, there may be a predefined number of 10 messaging servers 118 that support a front-end application 112; however, the predefined threshold of the minimum number of active messaging servers 118 able to handle the messaging load without degraded service to the front-end application may be 5 messaging servers 118. Thus, the self-healing application 134 may determine if the number of active messaging servers 118 is greater than 5. If the number of active messaging servers 118 is above the predefined threshold of 5 (e.g., 8 active messaging servers), then the self-healing application 134 may remove the at-risk messaging server 118 from the server rotation. Otherwise, if the number of active messaging servers 118 is equal to or less than the threshold of 5, then the self-healing application 134 may not remove the at-risk messaging server 118 from the server rotation since removal would result in an inadequate number of active messaging servers 118 in the server rotation for handling messaging loads (e.g., would result in degraded service to the front-end application).

Upon determining that the number of active messaging servers 118 is equal to or below the predefined threshold, then the self-healing application 134 may notify the system administrator that the at-risk messaging server 118 has not been removed from the server rotation in the system 100 due to the number of active messaging servers 118. The notification may also comprise the identified error and the corresponding performance metric value so that the system administrator may keep track of the potential risks associated with the at-risk messaging server 118. The at-risk messaging server 118 may remain in the server rotation until the self-healing application 134 or the system administrator determines at a later time that there are enough active messaging servers 118 in the server rotation to allow for the removal and subsequent repair of the at-risk messaging server 118. That is, if the number of active messaging servers 118 in the server rotation is determined to be above the predefined threshold at a later time, then the at-risk messaging server 118 may be removed in order to undergo repair by the self-healing application 134.

In the event that the number of active messaging servers 118 is determined to be above the predefined threshold, then the self-healing application 134 may remove the at-risk messaging server 118 from the server rotation in the system 100 and notify the system administrator of the removal. The notification may comprise the performance metric value and the identified error responsible for the server removal. After notifying the system administrator, the self-healing application 134 may conduct the repair by implementing the previously identified course of action. In an embodiment, the course of action may comprise rebooting the messaging server 118 or restarting a particular service on the messaging server 118.

Once the course of action for repair has been implemented, the self-healing application 134 may validate the repaired messaging server 118 by running application program interface (API) calls at the front-end application servers 112. In an embodiment, API calls may represent specific operations that the front-end application servers 112 may invoke to perform certain tasks, such as querying data, obtaining metadata, or running utilities to perform administration tasks. The API calls may comprise non-destructive testing techniques which may be used to evaluate the system 100 without causing damage. In an example, an API call may employ the web services device in the messaging layer 117 to fulfill a service request at a front-end application 112. The self-healing application 134 may receive the results from the API calls through the messaging layer 117 and subsequently validate the repaired messaging server 118 based on the results. After validating the repair, the self-healing application 134 may place the repaired messaging server 118 back in the server rotation in the system 100 and notify the system administrator of the completed repair, along with repair details and results from the API calls.

Therefore, by monitoring performance metric values and identifying errors in the messaging servers 118, the self-healing application 134 may repair and validate messaging servers 118 in an efficient manner. In an additional feature, the self-healing application 134 may be able to keep track of identified errors and performance metric values in the plurality of messaging servers 118 in order to detect systemic issues. For example, the self-healing application 134 may receive multiple alert messages corresponding to a plurality of at-risk messaging servers 118 in a server rotation of 10 messaging servers 118 in the system 100. There may be 5 messaging servers 118 that may be removed from service one after another due to identified errors and corresponding performance metric values in each. This deficiency of 5 messaging servers 118 in the server rotation may signify that there may be an underlying serious issue in the system 100 that may be causing the messaging servers 118 to continue to fail. An underlying serious issue may not be remedied by a repair with the self-healing application 134. Thus, the self-healing application 134 may take note of the identified errors and performance metric values in each at-risk messaging server 118 and may send this information to the system administrator. The system administrator may notify a service technician or IT member to examine the system 100 to diagnose the underlying issues.

In some instances, the identified error in the at-risk messaging server 118 may not correspond to a simple repair or a specific course of action. As previously mentioned, the self-healing application 134 may determine that an error in the at-risk messaging server 118 may best be addressed by a manual repair and may notify the system administrator accordingly. However, in other instances, the error identified in an alert message may correspond to issues in the back-end servers 116. In these cases, the self-healing application may take no action since the issues and/or problems lie within the back-end servers 116.

As an additional feature, the self-healing application 134 may also be able to return an inactive messaging server 118 to service if the number of active messaging servers 118 in the server rotation drops below the predefined threshold. As used herein, the term "inactive" may refer to messaging servers 118 that are currently out-of-service or not being used in the server rotation. In an embodiment, there may be 10 messaging servers 118 in a server rotation that supports a front-end application 112. The predefined threshold of the minimum number of active messaging servers 118 needed to handle the messaging load may be 5 messaging servers 118. If the number of active messaging servers 118 drops to 4, then the self-healing application 134 may bring one of the inactive messaging servers 118 back into the server rotation to assist in handling the load of messages received from and sent to the front-end application servers 112. This feature may allow the self-healing application 134 to handle dynamic changes in messaging loads in the server rotation and mitigate impact at the front-end.

Figure 2A:
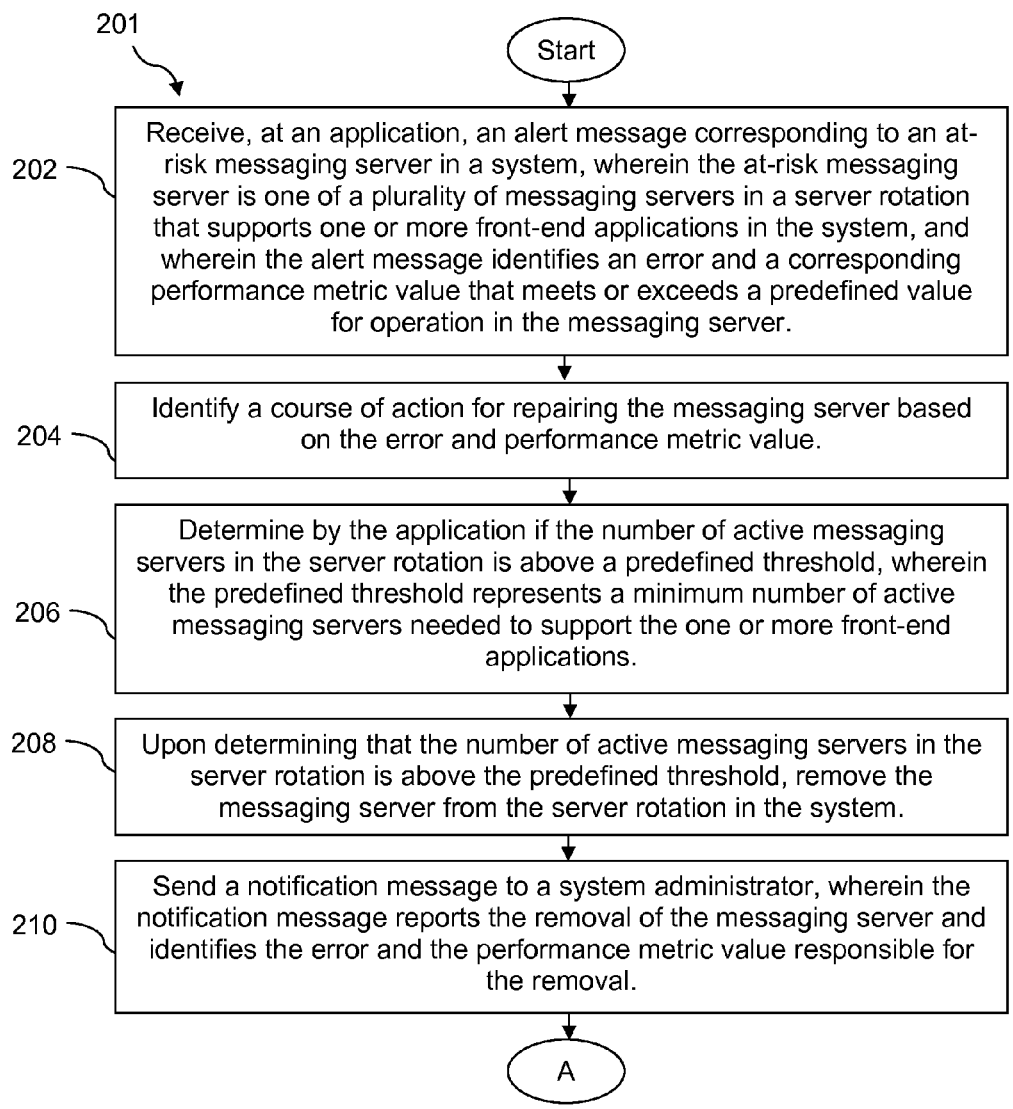
FIG. 2A and FIG. 2B is a flow chart illustrating a method according to an embodiment of the disclosure.
Figure 2B:
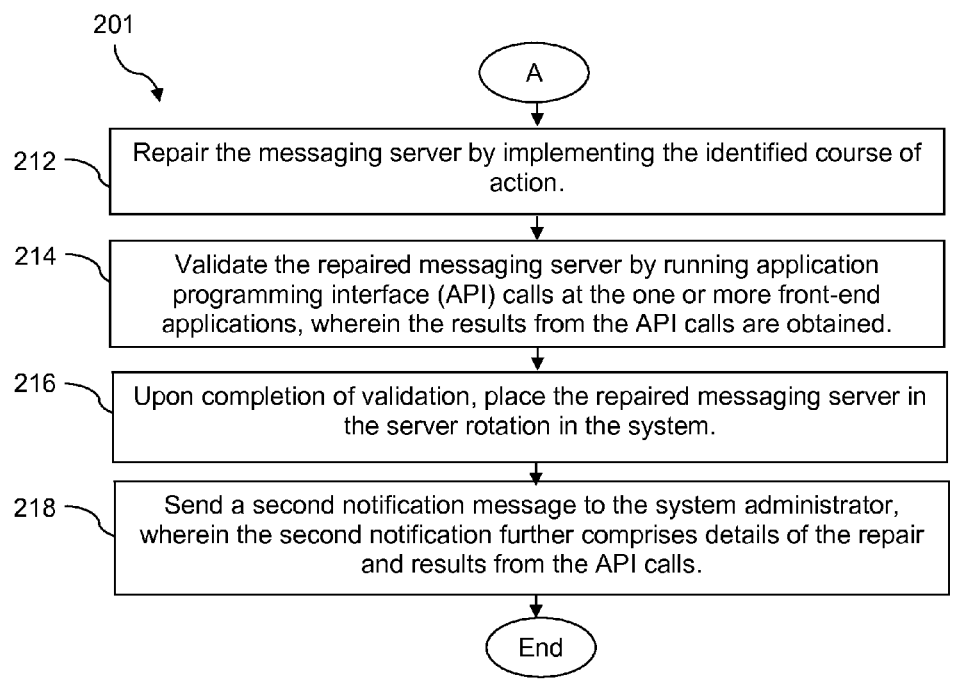

Referring now to FIG. 2A and FIG. 2B, a method 201 is disclosed. At block 202, a computer system for automated self-healing may receive, at an application, an alert message corresponding to an at-risk messaging server in a system, wherein the at-risk messaging server is one of a plurality of messaging servers in a server rotation that supports one or more front-end applications in the system, and wherein the alert message identifies an error and a corresponding performance metric value that meets or exceeds a predefined value for operation in the messaging server. In an embodiment, the self-healing application 134 in server 132 may receive an alert message corresponding to an identified error and performance metric value that meets or exceeds a predefined value for operation in an at-risk messaging server 118. The at-risk messaging server 118 may be one of the plurality of messaging servers 118 in a server rotation that supports one or more front-end application servers 112 in the system 100. At block 204, the application may identify a course of action for repairing the messaging server based on the error and performance metric value. In an embodiment, the self-healing application 134 may identify the course of action for repairing the at-risk messaging server 118.

At block 206, the application may determine if the number of active messaging servers in the server rotation is above a predefined threshold, wherein the predefined threshold represents a minimum number of active messaging servers needed to support the one or more front-end applications. In an embodiment, the self-healing application 134 may determine if the number of active messaging servers 118 (e.g., the messaging servers that are currently being used in the server rotation) is above a predefined threshold. In an embodiment, the predefined threshold may be set by the system administrator and may refer to the number of active messaging servers 118 needed to support the load of messages received from and sent to the one or more front-end application servers 112 in the system 100. At block 208, upon determining that the number of active messaging servers in the server rotation is above the predefined threshold, the application may remove the messaging server from the server rotation in the system 100. In an embodiment, the self-healing application 134 may remove the messaging server 118 from the server rotation in the system 100 after determining that there are a minimum number of active messaging servers in the server rotation. At block 210, the application may send a notification message to a system administrator, wherein the notification message reports the removal of the messaging server from the rotation and identifies the error and the performance metric value responsible for the removal. In an embodiment, the self-healing application 134 may notify the system administrator of the removal of the messaging server 118 and of the error and the performance metric value identified in the messaging server 118.

At block 212, the application may repair the messaging server by implementing the identified course of action, and at block 214, the application may validate the repaired messaging server by running application programming interface (API) calls at the one or more front-end applications, wherein the results from the API calls are obtained. In an embodiment, the self-healing application 134 may repair the messaging server 118 by executing the identified course of action (e.g., restarting a service or rebooting the server). In an embodiment, the self-healing application may run API calls at the one or more front-end application servers 112 that are supported by the repaired messaging server 118 and obtain results from the API calls. At block 216, the application may place the repaired messaging server back in the server rotation in the system upon completion of validation, and at block 218, the application may send a second notification message to the system administrator, wherein the second notification further comprises details of the repair and results from the API calls. In an embodiment, the self-healing application 134 may complete validation, bring the repaired messaging server 118 back into the server rotation in the system 100, and notify the system administrator. The notification may comprise details of the repair, such as the course of action that was implemented, as well as the results from the API calls.

Figure 3A:
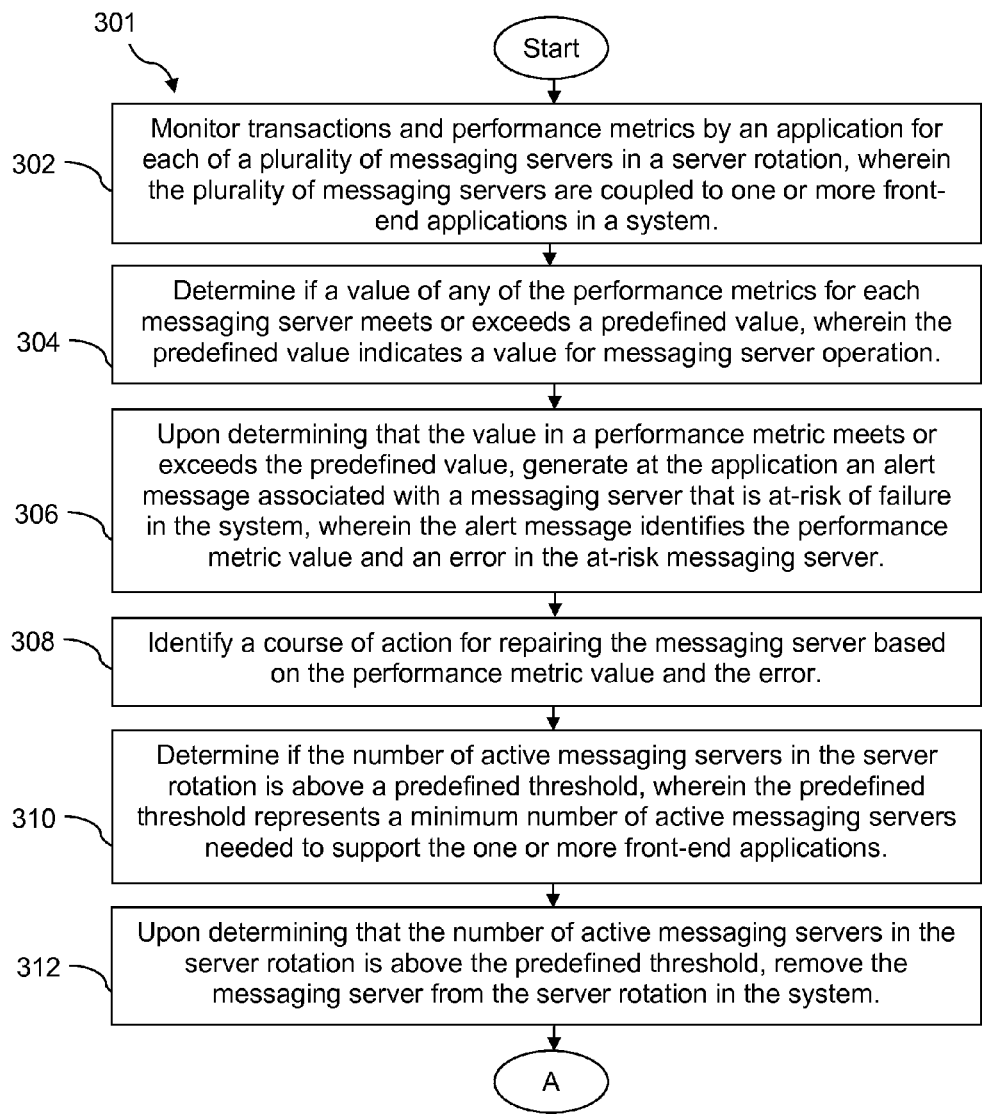
FIG. 3A and FIG. 3B is a flow chart illustrating another method according to an embodiment of the disclosure.
Figure 3B:
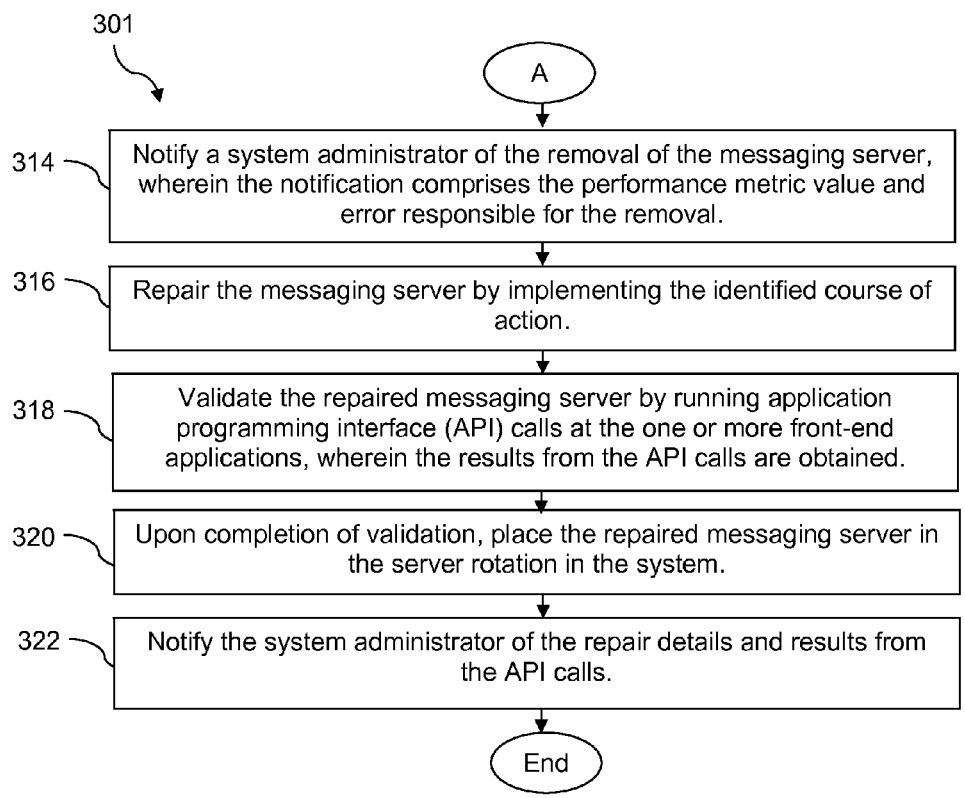

FIG. 3A and FIG. 3B is a flowchart of a method 301. At block 302, an application may monitor transactions and performance metrics for each of a plurality of messaging servers in a server rotation, wherein the plurality of messaging servers are coupled to one or more front-end applications in a system. In an embodiment, the self-healing application 134 may detect transactions and performance metrics in each of the plurality of messaging servers 118 in a server rotation that supports the one or more front-end application servers 112 in the system 100. At block 304, the application may determine if a value of any of the performance metrics for each messaging server meets or exceeds a predefined value, wherein the predefined value indicates a value for messaging server operation. In an embodiment, the self-healing application may determine if the performance metric values for each messaging server 118 meet or exceed predefined values for operation. At block 306, upon determining that the value in a performance metric meets or exceeds the predefined value, the application may generate an alert message associated with a messaging server that is at-risk of failure in the system 100, wherein the alert message identifies the performance metric value and an error in the at-risk messaging server. In an embodiment, the self-healing application 134 may generate an alert message corresponding to an at-risk messaging server 118, wherein the alert message identifies the performance metric value that meets or exceeds the predefined value and an associated error in the at-risk messaging server 118.

At block 308, the application may identify a course of action for repairing the messaging server based on the performance metric value and the error. In an embodiment, the self-healing application 134 may identify the course of action for repairing the at-risk messaging server 118. At block 310, the application may determine if the number of active messaging servers in the server rotation is above a predefined threshold, wherein the predefined threshold represents a minimum number of active messaging servers needed to support the one or more front-end applications. In an embodiment, the self-healing application 134 may determine if the number of active messaging servers 118 (e.g., the messaging servers that are currently being used in the server rotation) is above a predefined threshold. In an embodiment, the predefined threshold may be set by the system administrator and may refer to the number of active messaging servers 118 needed to support the load of messages received from and sent to the one or more front-end application servers 112 in the system 100.

At block 312, upon determining that the number of active messaging servers in the server rotation is above the predefined threshold, the application may remove the messaging server from the server rotation in the system. In an embodiment, the self-healing application 134 may remove the messaging server 118 from the server rotation in the system 100 after determining that there are at least a predefined minimum number of active messaging servers in the server rotation. At block 314, the application may notify a system administrator of the removal of the messaging server, wherein the notification comprises the performance metric value and error responsible for the removal. In an embodiment, the self-healing application 134 may notify the system administrator of the removal of the messaging server 118 and of the performance metric value and the error identified in the messaging server 118. At block 316, the application may repair the messaging server by implementing the identified course of action, and at block 318, the application may validate the repaired messaging server by running application programming interface (API) calls at the one or more front-end applications, wherein the results from the API calls are obtained. In an embodiment, the self-healing application 134 may repair the messaging server 118 by executing the identified course of action (e.g., restarting a service or rebooting the server). In an embodiment, the self-healing application may run API calls at the one or more front-end application servers 112 that are supported by the repaired messaging server 118 and obtain results from the API calls. At block 320, the application may place the repaired messaging server back in the server rotation in the system 100 upon completion of validation, and at block 322, the application may notify the system administrator of the repair details and results from the API calls. In an embodiment, the self-healing application 134 may complete validation, bring the repaired messaging server 118 back into the server rotation in the system 100, and notify the system administrator. The notification may comprise details of the repair, such as the course of action that was implemented, as well as the results from the API calls.

Figure 4:
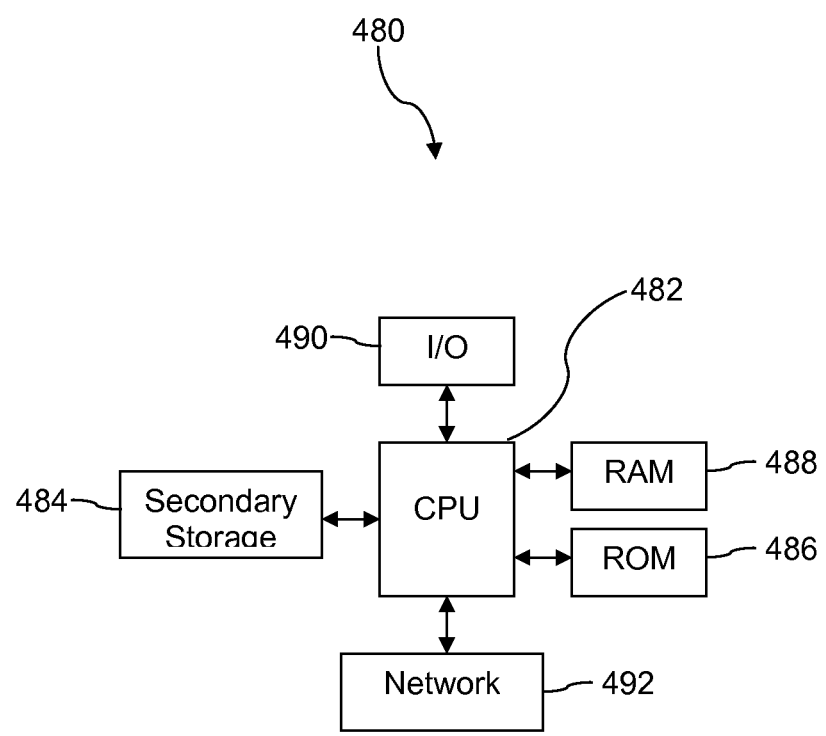
FIG. 4 illustrates an exemplary computer system suitable for implementing some aspects of the several embodiments of the disclosure.

FIG. 4 illustrates an embodiment of a computer system or server 480, which may be suitable for implementing one or more embodiments of the components disclosed herein, such as the server 132. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus, such as a server 132 comprising a self-healing application 134, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage 484, the RAM 488, and/or the ROM 486 may be referred to in some contexts as computer readable storage media and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 492 may enable the processor 482 to communicate with the Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data structures in part by directly accessing the computer program product, for example by reading from a CD-ROM disk inserted into a disk drive peripheral of the computer system 480. Alternatively, the processor 482 may process the executable instructions and/or data structures by remotely accessing the computer program product, for example by downloading the executable instructions and/or data structures from a remote server through the network connectivity devices 492. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

In some contexts, the secondary storage 484, the ROM 486, and the RAM 488 may be referred to as a non-transitory computer readable medium or a computer readable storage media. A dynamic RAM embodiment of the RAM 488, likewise, may be referred to as a non-transitory computer readable medium in that while the dynamic RAM receives electrical power and is operated in accordance with its design, for example during a period of time during which the computer 480 is turned on and operational, the dynamic RAM stores information that is written to it. Similarly, the processor 482 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A server for an automated self-healing computer system for resolving issues or problems experienced by a messaging server in a messaging layer, comprising:
    a processor;
    a non-transitory memory; and
    a self-healing application stored in the non-transitory memory that, when executed by the processor, is configured to:
        receive an alert message associated with an at-risk messaging server in a system, wherein the at-risk messaging server is one of a plurality of messaging servers in a server rotation in a messaging layer that enables communication between a plurality of front-end application servers and a plurality of back-end application servers, wherein the at-risk messaging server is associated with a front-end application of a plurality of front end applications, and wherein the alert message identifies an error and a corresponding performance metric value that meets or exceeds a predefined value for operation in the at-risk messaging server;

identify a course of action for repairing the at-risk messaging server based on the error and performance metric value;

determine if a number of active messaging servers in the server rotation is above a predefined threshold number, wherein the predefined threshold number represents a minimum number of active messaging servers needed to support the plurality of front-end applications;

in response to the received alert message and a determination that the number of active messaging servers in the server rotation is above the predefined threshold number, remove the at-risk messaging server from the server rotation;

send a notification message to a system administrator, wherein the notification message reports the removal of the at-risk messaging server and identifies the error and the performance metric value;

repair the at-risk messaging server by implementing the identified course of action;

validate the repaired at-risk messaging server by running application programming interface (API) calls;

in response to completion of validation, place the repaired at-risk messaging server in the server rotation, wherein the repair, validation, and placement of the at-risk messaging server are done automatically by the self-healing application without involvement from the system administrator; and sends a second notification message to the system administrator, wherein the second notification comprises details of the repair and results from the API calls.

2. The server of claim 1, wherein the plurality of messaging servers comprises message queue servers, wherein the message queue servers receive and deliver messages between the plurality of front-end applications and the plurality of back-end servers in the system.

3. The server of claim 2, wherein the plurality of back-end servers comprises computer systems that support and satisfy requests from the plurality of front-end applications.

4. The server of claim 1, wherein the active messaging servers comprise messaging servers that are currently in-service or being used in the server rotation.

5. The server of claim 1, wherein the predefined threshold number is configured by the system administrator according to service requirements, messaging loads, and/or capacity of the system.

6. A method performed by a computer system for automated self-healing to resolve issues or problems experienced by a messaging server in a messaging layer, comprising:

receiving, by a self-healing application stored in a non-transitory memory of a computer system and executable by a processor of the computer system, an alert message associated with an at-risk messaging server in a system, wherein the at-risk messaging server is one of a plurality of messaging servers in a server rotation in a messaging layer that enables communication between a plurality of front-end application servers and a plurality of back-end application servers, wherein the at-risk messaging server supports a front-end application of a plurality of front end applications in the system, and wherein the alert message identifies an error and a corresponding performance metric value that meets or exceeds a predefined value for operation in the at-risk messaging server;

identifying, by the self-healing application, a course of action for repairing the at-risk messaging server based on the error and performance metric value;

determining, by the self-healing application, if a number of active messaging servers in the server rotation is above a predefined threshold, wherein the predefined threshold represents a minimum number of active messaging servers to support a plurality of front-end applications;

in response to the received alert message and a determination that the number of active messaging servers in the server rotation is above the predefined threshold, removing, by the self-healing application, the at-risk messaging server from the server rotation in the system;

repairing, by the self-healing application, the at-risk messaging server by implementing the identified course of action;

validating, by the self-healing application, the repaired at-risk messaging server by running application programming interface (API) calls at the plurality of front-end applications, wherein the results from the API calls are obtained;

in response to completion of validation, placing, by the self-healing application, the repaired at-risk messaging server in the server rotation in the system, wherein the repair, validation, and placement of the at-risk messaging server are done automatically by the self-healing application without involvement from a system administrator; and sending, by the self-healing application, a notification message to the system administrator, wherein the notification further comprises details of the repair and results from the API calls.

7. The method of claim 6, wherein the alert message is sent to the self-healing application through the messaging layer in the system.

8. The method of claim 7, wherein the plurality of messaging servers employs a message broker in the messaging layer in the system, wherein the message broker transforms messages from one format to another and routes messages between the plurality of front-end applications, the plurality of messaging servers, and the plurality of back-end servers in the system.

9. The method of claim 6, wherein the identified error in the at-risk messaging server is associated with an unavailable or failed service, power supply failure, failed file validation, certification error, out-of-memory error, exhaustion of execution resources, or another error associated with operation in the at-risk messaging server.

10. The method of claim 6, wherein the course of action comprises an action previously identified for repair.

11. The method of claim 6, wherein the course of action comprises rebooting the at-risk messaging server or restarting a particular service in the at-risk messaging server.

12. The method of claim 6, wherein the minimum number of active messaging servers comprises a number of active messaging servers capable of handling peak messaging loads received or sent within the system.

13. The method of claim 6, further comprising:

in response to a determination that the number of active messaging servers in the server rotation is below or equal to the predefined threshold, keeping, by the self-healing application, the at-risk messaging server in the server rotation in the system; and notifying, by the self-healing application, the system administrator that the at-risk messaging server has not been removed from the server rotation in the system due to the number of active messaging servers, wherein the notification comprises the identified error and the corresponding performance metric value.

14. A method of monitoring and implementing self-healing in a system to resolve issues or problems experienced by a messaging server in a messaging layer, comprising:

monitoring, by a self-healing application stored in a non-transitory memory of a computer system and executable by a processor of the computer system, transactions and performance metrics for each of a plurality of messaging servers in a server rotation in a messaging layer that enables communication between a plurality of front-end application servers and a plurality of back-end application servers, wherein the plurality of messaging servers are coupled to a front-end application in the system;

determining, by the self-healing application, if a value of any of the performance metrics for each messaging server meets or exceeds a predefined value, wherein the predefined value indicates a value for messaging server operation;

based on a determination that the value in a performance metric meets or exceeds the predefined value, generating, by the self-healing application, an alert message associated with a messaging server that is at-risk of failure in the system, wherein the alert message identifies the performance metric value and an error in the at-risk messaging server;

identifying, by the self-healing application, a course of action for repairing the at-risk messaging server based on the performance metric value and the error;

determining, by the self-healing application, if a number of active messaging servers in the server rotation is above a predefined threshold, wherein the predefined threshold represents a minimum number of active messaging servers needed to support a plurality of front-end applications;

in response to receiving the alert message and a determination that the number of active messaging servers in the server rotation is above the predefined threshold, removing, by the self-healing application, the at-risk messaging server from the server rotation in the system;

notifying, by the self-healing application, a system administrator of the removal of the at-risk messaging server, wherein the notification comprises the performance metric value and error responsible for the removal;

repairing, by the self-healing application, the at-risk messaging server by implementing the identified course of action;

validating, by the self-healing application, the repaired at-risk messaging server by running application programming interface (API) calls at the plurality of front-end applications, wherein the results from the API calls are obtained; and in response to the validation, placing, by the self-healing application, the repaired at-risk messaging server in the server rotation in the system, wherein the repair, validation, and placement of the at-risk messaging server are done automatically by the self-healing application without involvement from the system administrator.

15. The method of claim 14, wherein the performance metrics comprise standards of measurement for operation in each of the plurality of messaging servers.

16. The method of claim 14, wherein the server rotation is employed to handle the load of messages received from and sent to components within the system.

17. The method of claim 14, wherein the plurality of back-end servers support and satisfy requests from the plurality of front-end applications.

18. The method of claim 17, further comprising:

identifying, by the self-healing application, an error in the at-risk messaging server, wherein the error corresponds to one or more issues in the plurality of back-end servers; and upon identifying the error, taking no action to repair the at-risk messaging server.

19. The method of claim 14, wherein the number of messaging servers in the server rotation is selected by the system administrator.

\* \* \* \* \*